US011574292B2

(12) United States Patent
Nelms et al.

(10) Patent No.: US 11,574,292 B2
(45) Date of Patent: Feb. 7, 2023

(54) OPEN MOBILE PAYMENT SYSTEMS AND METHODS

(71) Applicant: Walmart Apollo, LLC, Bentonville, AR (US)

(72) Inventors: David M. Nelms, Rogers, AR (US); Bradley J. Kieffer, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 251 days.

(21) Appl. No.: 16/159,198

(22) Filed: Oct. 12, 2018

(65) Prior Publication Data

US 2019/0114608 A1    Apr. 18, 2019

Related U.S. Application Data

(60) Provisional application No. 62/688,968, filed on Jun. 22, 2018, provisional application No. 62/572,314, filed on Oct. 13, 2017.

(51) Int. Cl.
*G06Q 20/20* (2012.01)
*G06Q 20/32* (2012.01)
(Continued)

(52) U.S. Cl.
CPC .......... *G06Q 20/20* (2013.01); *G06Q 20/202* (2013.01); *G06Q 20/204* (2013.01);
(Continued)

(58) Field of Classification Search
CPC ...... G06Q 20/36; G06Q 20/20; G06Q 20/227; G06Q 20/367; G06Q 20/3674;
(Continued)

(56) References Cited

U.S. PATENT DOCUMENTS 7,822,688 B2    10/2010   Labrou
8,401,966 B2     3/2013   Stewart
(Continued)

OTHER PUBLICATIONS

PCT; App. No. PCT/US2018/055347; International Search Report and Written Opinion dated Dec. 21, 2018.

*Primary Examiner* — Paul Danneman
(74) *Attorney, Agent, or Firm* — Fitch, Even, Tabin & Flannery LLP

(57) ABSTRACT

Systems, apparatuses, and methods are provided herein for payments through point of sale systems. A system comprises a plurality of in-store POS systems, a user accounts database, and a merchant payment system configured to communicate with a plurality of user devices and a plurality of digital wallet provider systems. The merchant payment system comprises a control circuit configured to associate a user account with a plurality of digital wallet accounts in the user accounts database, wherein at least one of the plurality of digital wallet accounts is associated with two or more payment methods, receive a transaction request from a user device associated with the user account, select a digital wallet provider from the plurality of digital wallet accounts associated with the user account, and send a payment authorization request to a digital wallet provider system associated with the digital wallet provider for payment authorization.

19 Claims, 10 Drawing Sheets

(51) Int. Cl.
*G06Q 20/36* (2012.01)
*G06Q 20/38* (2012.01)

(52) U.S. Cl.
CPC ......... *G06Q 20/322* (2013.01); *G06Q 20/367* (2013.01); *G06Q 20/3674* (2013.01); *G06Q 20/387* (2013.01)

(58) Field of Classification Search
CPC .............. G06Q 20/322; G06Q 20/3227; G06Q 20/3572; G06Q 20/405; G06Q 20/202; G06Q 20/204; G06Q 20/387
See application file for complete search history.

(56) References Cited

U.S. PATENT DOCUMENTS

| | | |
|---|---|---|
| 9,626,675 B2 | 4/2017 | Desai |
| 9,697,508 B1 * | 7/2017 | Ramalingam ...... G06Q 30/0222 |
| 9,727,862 B2 | 8/2017 | Craig |
| 10,366,385 B1 * | 7/2019 | Ramalingam ...... G06Q 20/3674 |
| 10,692,059 B1 * | 6/2020 | Thome ................ G06Q 20/3221 |
| 2009/0094125 A1 | 4/2009 | Killian |
| 2010/0125510 A1 | 5/2010 | Smith |
| 2010/0250955 A1 | 9/2010 | Trevithick |
| 2013/0246258 A1 | 9/2013 | Dessert |
| 2014/0149293 A1 | 5/2014 | Laracey |
| 2014/0195363 A1 | 7/2014 | Van |
| 2014/0344149 A1 | 11/2014 | Campos |
| 2015/0058162 A1 | 2/2015 | Purves |
| 2015/0254645 A1 * | 9/2015 | Bondesen ............ G06Q 20/385 705/41 |
| 2016/0063486 A1 | 3/2016 | Purves |
| 2016/0162875 A1 * | 6/2016 | DeSoto .................. H04L 63/08 705/21 |
| 2018/0108011 A1 * | 4/2018 | O'Regan ................ G06Q 20/36 |

* cited by examiner

OPEN MOBILE PAYMENT SYSTEMS AND METHODS

CROSS-REFERENCE TO RELATED APPLICATION

This application claims the benefit of U.S. Provisional Application No. 62/688,968 filed Jun. 22, 2018 and U.S. Provisional Application No. 62/572,314 filed Oct. 13, 2017, both of which are incorporated herein by reference in their entirety.

TECHNICAL FIELD

This invention relates generally to payment processing systems.

BACKGROUND

Conventionally, point of sale (POS) systems are set up to accept cash and bank card payments. Several new forms of payment methods have been developed recently. POS systems typically require hardware and/or software upgrades to accept these new forms of payment.

BRIEF DESCRIPTION OF THE DRAWINGS

Disclosed herein are embodiments of apparatuses and methods for processing payments through POS systems. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for processing payments through a point of sale (POS) system. In one embodiment, a system comprises a plurality of in-store POS systems configured to identify items for checkout, a user accounts database, and a merchant payment system configured to communicate with a plurality of user devices and a plurality of digital wallet provider systems. The merchant payment system comprises a control circuit configured to associate a user account with a plurality of digital wallet accounts in the user accounts database, wherein each digital wallet account is associated with a digital wallet provider and wherein at least one of the plurality of digital wallet accounts is associated with two or more payment methods, receive a transaction request from a user device associated with the user account, the transaction request comprises a user account identifier and a POS identifier associated with an in-store POS system, receive a charge amount from the in-store POS system for a transaction, select a digital wallet provider from the plurality of digital wallet accounts associated with the user account, send a payment authorization request to a digital wallet provider system associated with the digital wallet provider for payment authorization, the payment authorization request comprises digital wallet account information retrieved from the user accounts database, and communicate a result of the payment authorization to the in-store POS system to complete the transaction.

Figure 1:
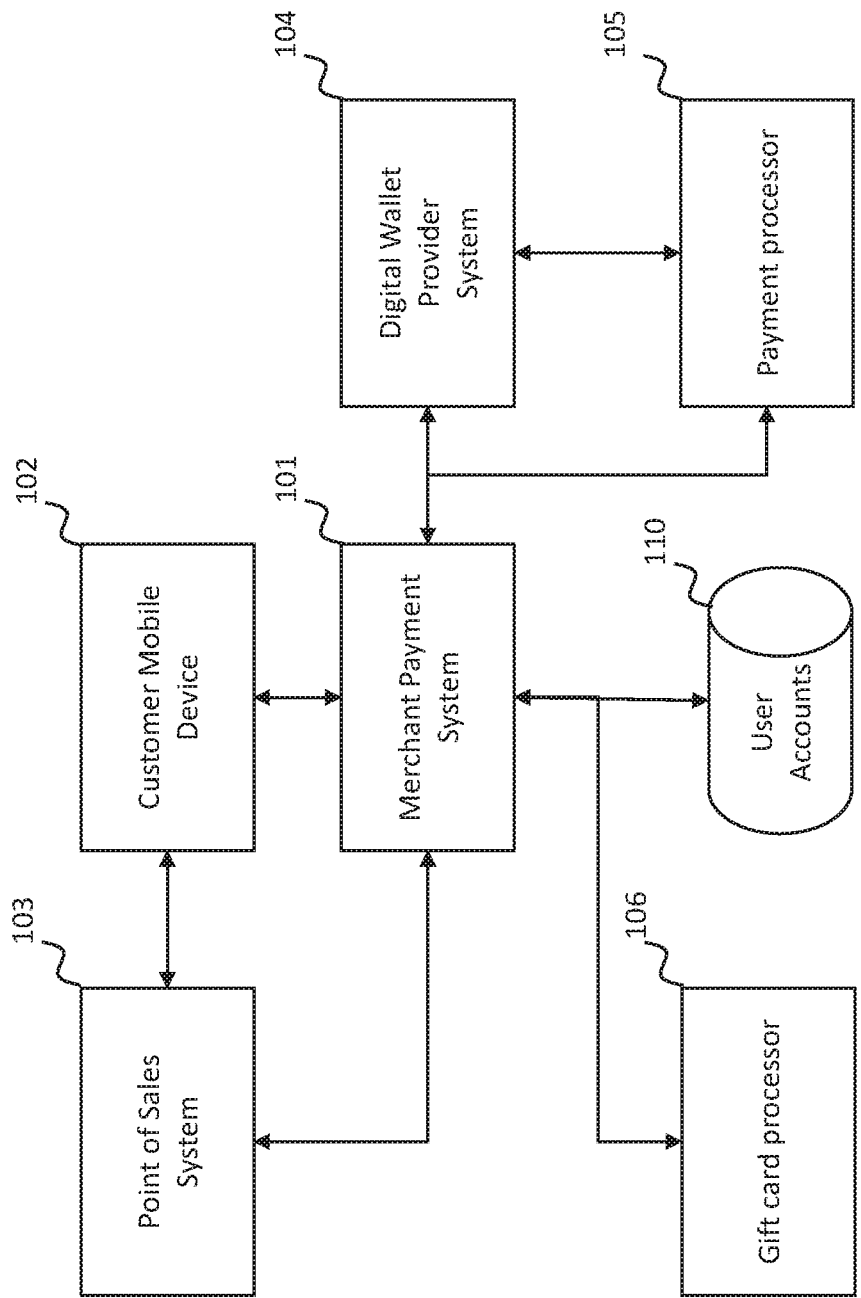
FIG. 1 comprises a system diagram in accordance with several embodiments.

Referring now to FIG. 1, a payment system is shown. The system comprises a merchant payment system 101, a customer mobile device 102, a point of sale system 103, a digital wallet provider system 104, a payment processor 105, a user accounts database 110, and a gift card processor 106. While one of each of the point of sale system 103, the customer mobile device 102, the digital wallet provider system 104, and the payment processor 105 are shown in FIG. 1, the merchant payment system 101 may simultaneously communicate with a plurality of point of sale systems, customer mobile devices, payment processor systems and/or digital wallet provider systems.

The merchant payment system 101 generally refers to a merchant payment server that handles payments made at the point of sale systems 103 associated with the merchant. In some embodiments, the merchant payment system 101 may comprise a processor-based system, a server device, a cloud-based server, a networked computer, etc. In some embodiments, the merchant payment system may serve a specific store location or comprise a central server system that serves a plurality of geographically dispersed store locations. The merchant payment system 101 may comprise one or more processor-based devices comprising at least a control circuit, a memory device, and a network interface device. The control circuit of the merchant payment system may comprise a processor, a microprocessor, a microcontroller, and the like and is configured to execute computer-readable instructions stored in a computer-readable storage memory. The computer-readable storage memory may comprise volatile and/or non-volatile memory and have stored upon it a set of computer readable instructions which, when executed by the control circuit, causes the control circuit to communicate with one or more of the customer mobile device 102, the point of sale system 103, the digital wallet provider system 104, the payment processor 105, and the gift card processor 106 to process payment for customers. In some embodiments, the merchant payment system 101 may be configured to perform one or more steps described with reference to FIGS. 2-10 herein.

The customer mobile device 102 generally refers to a mobile device carried by a customer. In some embodiments, the customer mobile device 102 may comprise a smartphone, a mobile phone, a smartwatch, a wearable device, and the like. The customer mobile device 102 may comprise a processor-based device comprising at least a control circuit, a memory device, and a network interface device. In some embodiments, the customer mobile device 102 may further comprise user interface devices such as a display screen, a touch screen, one or more buttons, a camera, a speaker, etc. The control circuit of the merchant payment system may comprise a processor, a microprocessor, a microcontroller, and the like and is configured to execute computer-readable instructions stored in a computer-readable storage memory. The computer-readable storage memory may comprise volatile and/or non-volatile memory and have stored upon it a set of computer readable instructions which, when executed by the control circuit, causes the control circuit to provide a user interface to the customer to use the merchant payment system. In some embodiments, the user interface may comprise a mobile application associated with the merchant payment system. The mobile application may be configured to allow the user to register for a merchant payment account, associate digital wallet accounts with the merchant payment account, and initiate payments using the merchant payment account at points of sale. In some embodiments, the customer mobile device comprises an image sensor (e.g. camera) configured to capture images to initiate payments using the merchant payment account.

The point of sale system 103 generally refers to a system in a retail store configured to identify items for checkout. In some embodiments, the point of sale system 103 may comprise conventional checkout counters operated by a store associate and/or a self-checkout counter. The point of sale system 103 may comprise a processor-based device comprising at least a control circuit, a memory device, and a network interface device. The point of sale system 103 may also comprise item identifiers such as a barcode scanner, an optical reader, a radio frequency identification (RFID) tag reader, etc. In some embodiments, the point of sale system 103 may further comprise user interface devices such as a display screen, a touch screen, a keyboard, etc. The control circuit of the merchant payment system may comprise a processor, a microprocessor, a microcontroller, and the like and is configured to execute computer-readable instructions stored in a computer-readable storage memory. The computer-readable storage memory may comprise volatile and/or non-volatile memory and have stored upon it a set of computer readable instructions which, when executed by the control circuit, causes the control circuit to detect item information and accept customer payment for checkout. In some embodiments, the point of sale system 103 comprises a display screen configured to display a point of sale system identifier that can be scanned by a merchant application running on the customer mobile device 102. In some embodiments, the point of sale system 103 may further be configured to display transaction information and payment confirmation to the customers and/or store associates. In some embodiments, the point of sale system 103 may further be configured to accept conventional forms of payment such as cash, credit card, and debit card.

The digital wallet provider system 104 generally refers to a system associated with and supports a digital wallet service. A digital wallet, as described herein, generally refers to a service that allows customers to use a digital form of their credit cards and debit cards through their mobile device. In some embodiments, the digital wallet provider system 104 communicates with a conventional payment processor 105 to process payments. In some embodiments, the digital wallet provider may comprise a financial services provider that also processes conventional payment methods such as credit card and debit card payments. In some embodiments, a digital wallet may also be referred to as a mobile wallet. Examples of current digital wallet providers include Apple Pay, Android Pay, Samsung Pay, and Chase Pay.

The payment processor 105 generally refers to a system for processing conventional methods of payment such as credit card and debit card. In some embodiments, the payment processor comprises processors in the Payment Card Industry (PCI). Example of current payment processors includes Visa, Master, American Express, etc.

The gift card processor 106 generally refers to a system that processes payment using a gift card. In some embodiments, the gift card processor may be part of the merchant payment system that processes merchant-issued gift cards. The gift card processor 106 may be configured to authenticate gift cards based on card authentication information received at the point of sale system 103, check and update gift card balances for transactions, and maintain a record of gift card balances between transactions.

The user accounts database 110 generally refers to a computer readable memory device configured to store user account information associated with the merchant payment system. In some embodiments, the merchant payment account allows a customer to use a merchant application to pay for purchases in-store. In some embodiments, each merchant payment account may be linked to a plurality of conventional payment instruments (e.g. credit card, debit card, gift card, bank account, etc.) and be linked to a plurality of digital wallet accounts (e.g. Apple Pay, Samsung Pay, etc.) After a customer links the merchant payment account with a payment instrument and/or digital wallet account, the authorization information is stored in the user accounts database 110 for future transactions. In some embodiments, the user accounts database may further store user profiles, user payment preferences, user purchase histories, etc. In some embodiments, user payment preferences may comprise a set of rules that indicate which payment method (e.g. credit card or digital wallet) should be used for a transaction. In some embodiments, the rules may associate transaction amount, purchased items, transaction location, etc. with different payment methods. In some embodiments, the user may select a default payment method in user references and use other payment methods for backup. In some embodiments, the user may select a payment method through the merchant application running on the customer mobile device 102 before or during checkout.

In some embodiments, one or more of the merchant payment system 101, the point of sale system 103, the user accounts database 110, and the gift card processor may comprise a merchant payment network maintained and controlled by the merchant. In some embodiments, the digital wallet provider system 104 and the payment processor 105 may comprise third-party payment services. In some embodiments, one or more of the merchant payment system 101, the customer mobile device 102, the point of sale system 103, the digital wallet provider system 104, the payment processor 105, the user accounts database 110, and the gift card processor 106 may communicate with one or more other components of the system through a private network, a virtual private network, a secure network, a Payment Card Industry Data Security Standard (PCI DDS) compliant network, a public network, the Internet, and the like.

Figure 2:
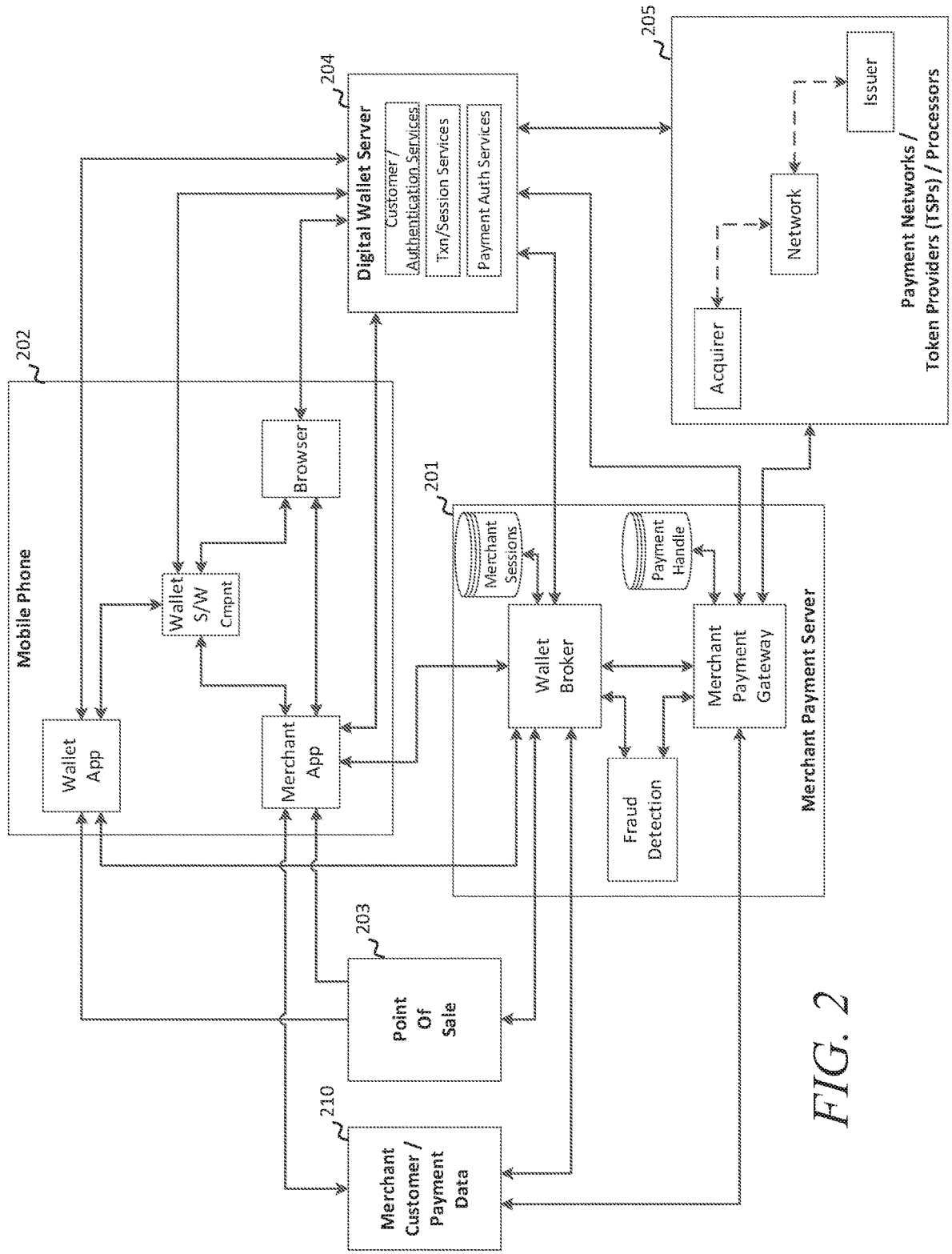
FIG. 2 comprises a block diagram in accordance with several embodiments.

Now referring to FIG. 2, a payment system is shown. The system comprises a merchant payment server 201, a mobile phone 202, a point of sale system 203, a digital wallet server 204, a payment network 205, and a merchant customer/ payment database 210. While one of each of the point of sale system 203, the mobile phone 202, the digital wallet server 204, and the payment network 205 is shown in FIG. 2, the merchant payment system 101 may simultaneously communicate with a plurality of point of sale systems, customer mobile devices, payment processor systems, and/or digital wallet servers.

The merchant payment server 201 generally refers to a merchant payment server that handles payments made at the point of sale systems 203 associated with the merchant. The merchant payment server 201 comprises a wallet broker module, a fraud detection module, a merchant payment gateway module, a merchant session's database, and a payment handles database. The merchant payment server 201 is configured to communicate with one or more of the mobile phone 202, the point of sale system 203, the digital wallet server 204, and the payment network 205 to process payments for customers. In some embodiments, the merchant payment server 201 comprises the merchant payment system 101 described with reference to FIG. 1 herein.

The mobile phone 202 generally refers to a mobile device operated by a customer. In some embodiments, the functions of the mobile phone 202 may be performed by a smartphone, a mobile phone, a smartwatch, a wearable device, and the like. The mobile phone 202 comprises one or more of a wallet application, a merchant application, a wallet software component, and a browser. While only one wallet software component is shown in the merchant mobile application, the mobile device may comprise a plurality of wallet software components associated with different digital wallet providers (e.g. Apple Pay, Android Pay, Samsung Pay, etc.). In some embodiments, the wallet application or the merchant application may be omitted. For example, in the processes described in, FIGS. 3-6, an external digital wallet is integrated with the merchant application and the wallet application may be omitted. In the processes described in FIGS. 7-9, the external wallet is integrated with the wallet broker of the merchant payment server 201 and the merchant application on the mobile phone 202 may be omitted. In some embodiments, the mobile phone 202 comprises the customer mobile device 102 described with reference to FIG. 1 herein.

The point of sale system 203 generally refers to a system in a retail store configured to identify items for checkout. In some embodiments, the point of sale system 203 may comprise conventional checkout counters operated by a store associate and/or a self-checkout counter. In some embodiments, the POS system 203 comprises the POS system 103 described with reference to FIG. 1 herein.

The digital wallet server 204 generally refers to a system associated with and supports a digital wallet service. The digital wallet server 204 comprises a customer authentication service module, a transaction/session service module, and a payment authorization service module. In some embodiments, the digital wallet server 204 comprises the digital wallet provider system 104 described with reference to FIG. 1 herein.

The payment network 205 generally refers to a network of token providers (TSPs) and systems for processing conventional methods of payment such as credit card and debit card. In some embodiments, the payment network 205 may communicate with acquirers and issuers. In some embodiments, acquirers and issuers may communicate directly without a network. In some embodiments, the payment network 205 comprises the payment processor 105 described with reference to FIG. 1 herein.

The merchant customer/payment database 210 generally refers to a computer readable memory device configured to store user account and payment information associated with the merchant payment system. In some embodiments, the merchant customer/payment database 210 comprises the user account database 110 described with reference to FIG. 1 herein.

Figure 7:
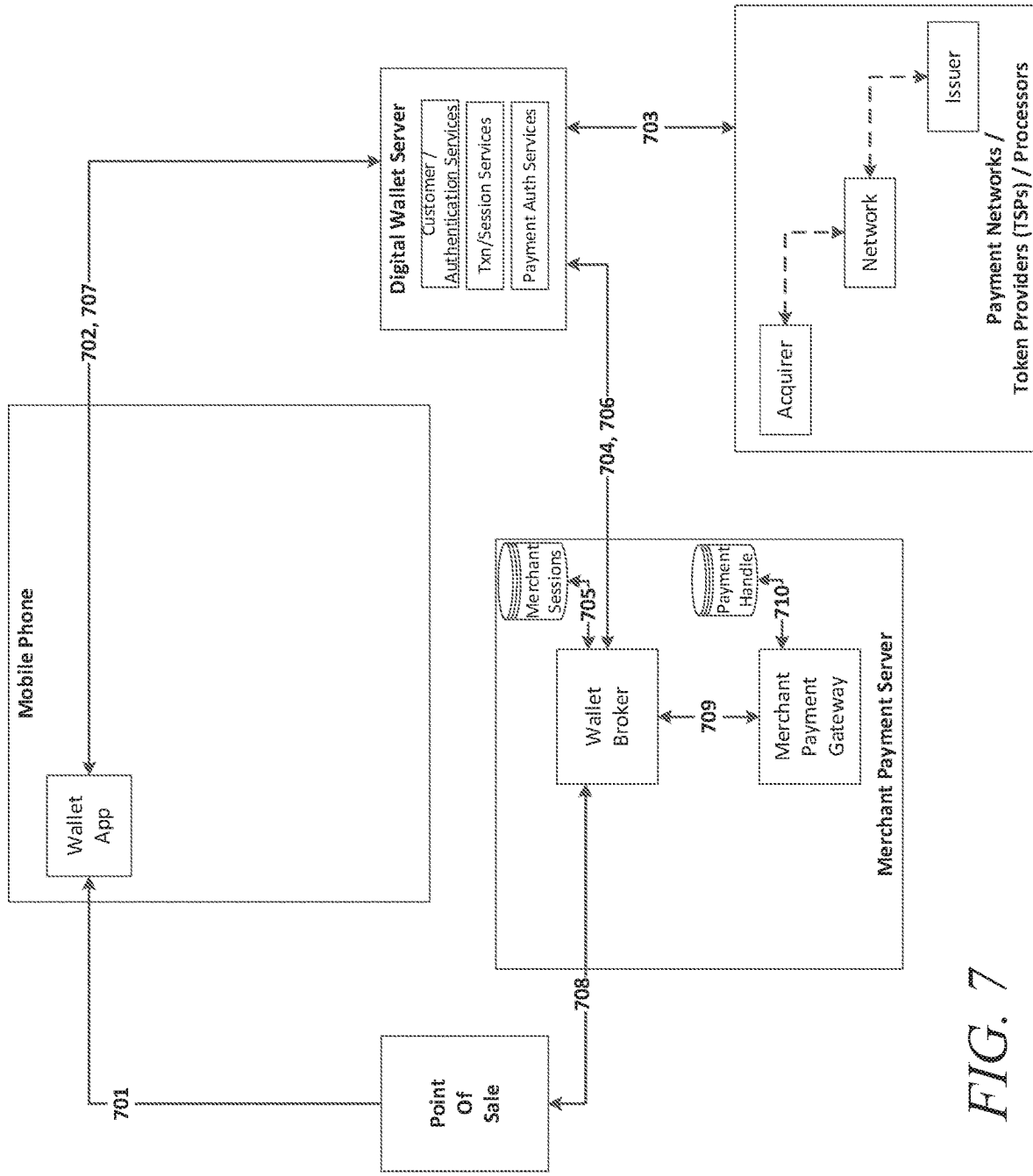
FIG. 7 comprises a process diagram of a pairing process in accordance with several embodiments.
Figure 8:
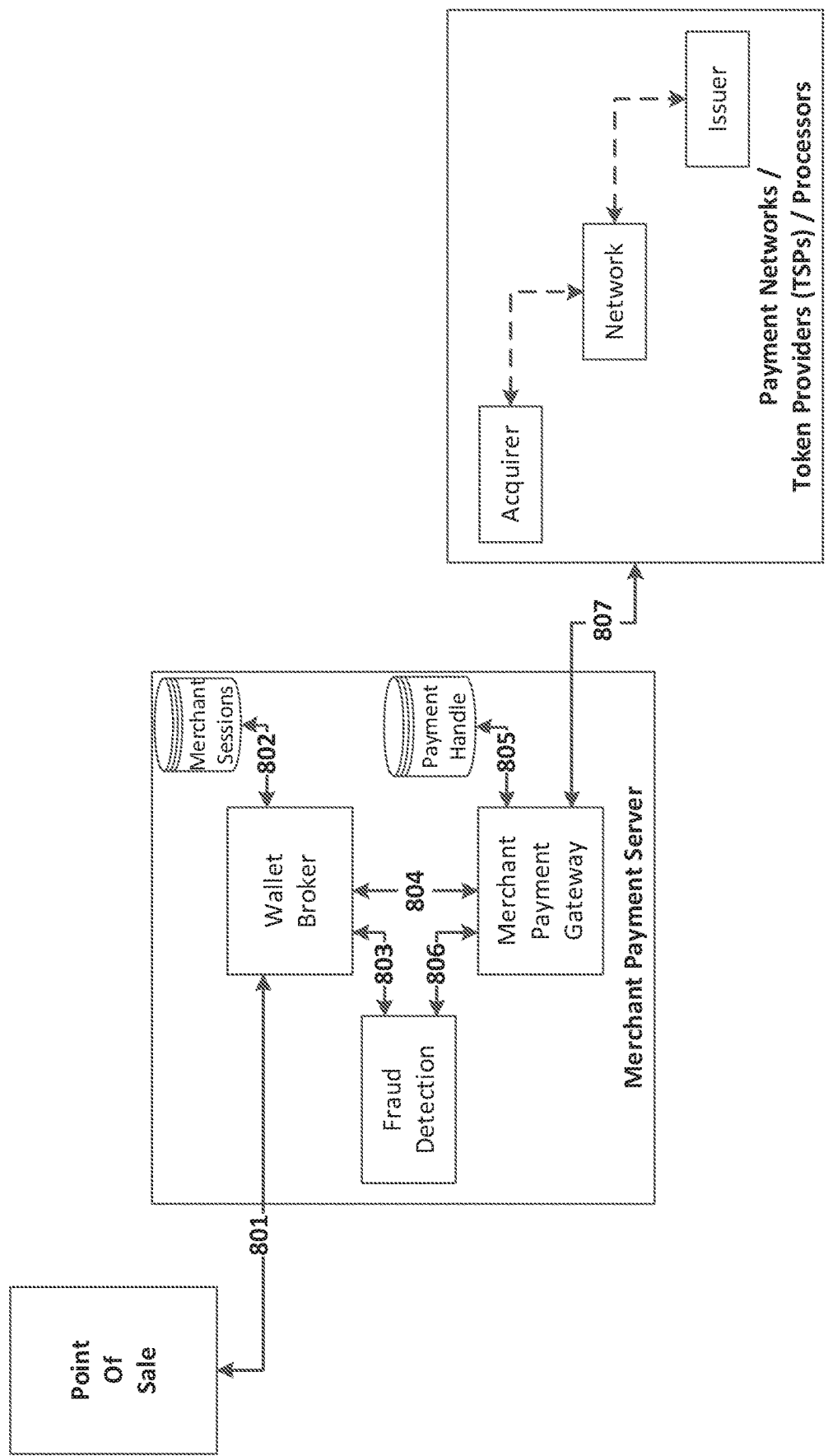
FIG. 8 comprises a process diagram of an authorization process in accordance with several embodiments.
Figure 9:
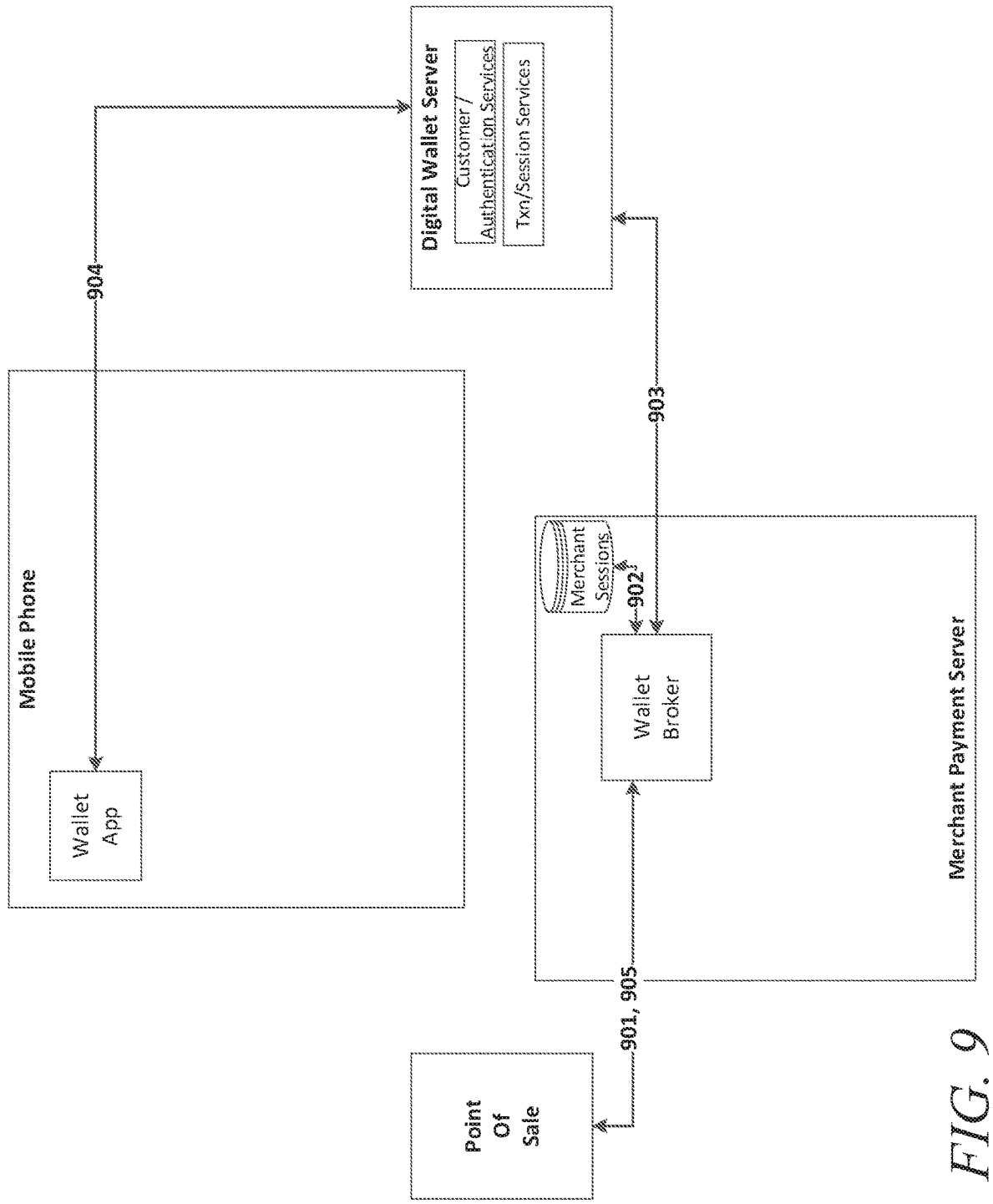
FIG. 9 comprises a process diagram of a confirmation process in accordance with several embodiments.

In some embodiments, one or more of the merchant payment server 201, the mobile phone 202, the point of sale system 203, the digital wallet server 204, the payment network 205, and the merchant customer/payment database 210 may communicate with one or more other components of the system through a private network, a virtual private network, a secure network, a Payment Card Industry Data Security Standard (PCI DDS) compliant network, a public network, the Internet, and the like. Examples of communications between the components of FIG. 2 in supporting the processing of customer payment is described with reference to FIGS. 3-9 herein. FIGS. 3-6 are generally directed to the setup, pairing, authorization, and payment completion processes of a system in which an external wallet is integrated with the merchant application. FIGS. 7-9 are generally directed to the pairing, authorization, and completion process of a system in which the external wallet is integrated with the wallet broker of the merchant payment server.

Figure 3:
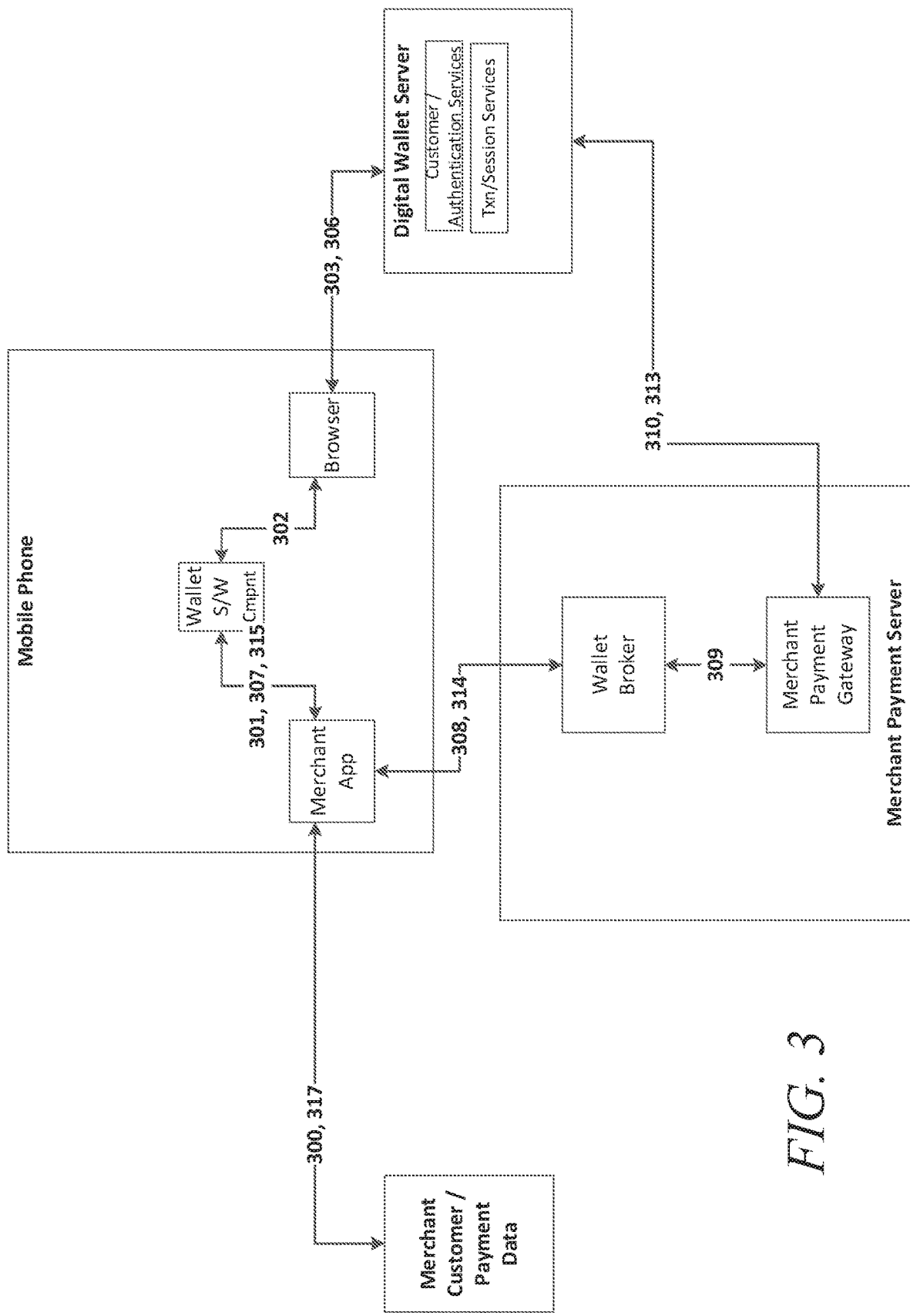
FIG. 3 comprises a process diagram of a setup process in accordance with several embodiments.

Referring now to FIG. 3, a process for provisioning a merchant user account with a digital wallet account is shown. In some embodiments, the mobile phone, the merchant customer/payment database, the merchant payment server, and the digital wallet server may comprise the mobile phone 202, the merchant customer/payment database 210, the merchant payment server 201, and the digital wallet server 204, respectively, as described with reference to FIG. 2 herein or similar devices.

In some embodiments, prior to step 300, the customer has enrolled in a digital wallet service, signed up for a merchant user account, and downloaded the merchant's payment application on the customer mobile device. In step 300, the customer logs into the merchant application using merchant user account credentials and the merchant payment server authenticates the customer based on the provided credentials.

In step 301, the customer navigates the merchant application and selects a particular digital wallet (DW) provider, which triggers a call to the digital wallet software component through the merchant application. In step 302, the digital wallet software component drives the display of a user interface for the digital wallet service. In some embodiments, the digital wallet application or a browser may be used to provide the user interface in step 302. In step 303, the user's authentication information is passed to the digital wallet server and the digital wallet server creates a digital wallet session ID for the session between the customer mobile phone and the digital wallet server. In step 306, the digital wallet session ID is returned to the browser. In step 307, the session ID is provided to the merchant application via the wallet software component.

In step 308, the merchant application sends the user ID, the digital wallet session ID, and the customer mobile phone information to a wallet broker module of the merchant payment server. In step 309, the broker module forwards the user ID, the digital wallet session ID, and the customer mobile phone information to a merchant payment gateway module. In step 310, the merchant payments module sends the user ID, the digital wallet session ID, and the customer mobile phone information to the digital wallet server.

In step 313, a digital wallet customer token is sent to the merchant payment system which saves the digital wallet provider as a payment option for the customer account and returns the information to the wallet broker module. In step 314, the wallet broker module forwards the digital wallet customer token to the merchant application on the customer mobile device. The digital wallet customer token is passed to the digital wallet software component via the merchant application in step 315, and the digital wallet software component stores the digital wallet customer token for future use. In step 317, the mobile application updates the customer/payment information in the database to reflect that the customer has set up the digital wallet for future use.

Figure 4:
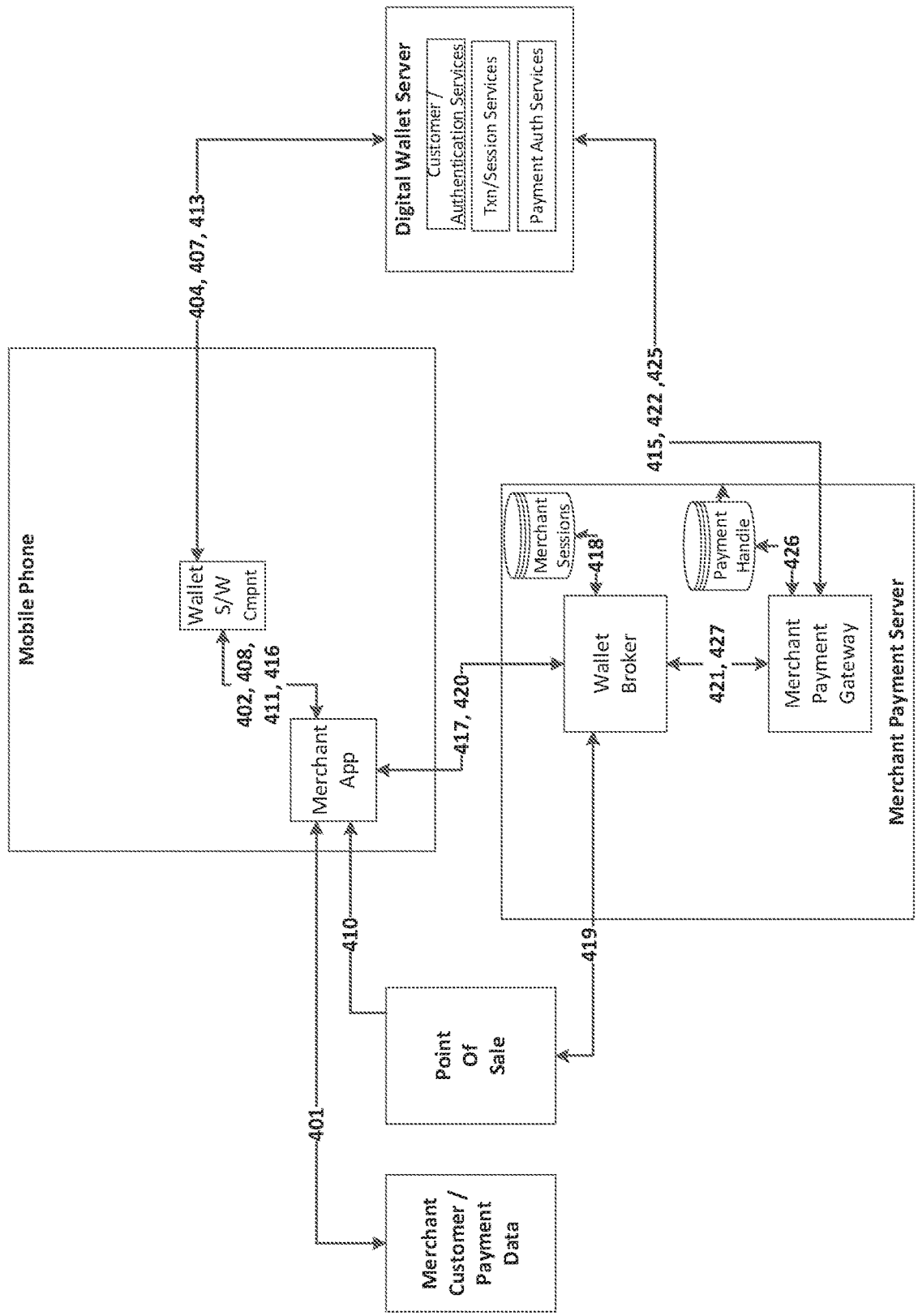
FIG. 4 comprises a process diagram of a pairing process in accordance with several embodiments.

Referring now to FIG. 4, a process for pairing a mobile phone with a point of sale system via a digital wallet account is shown. In some embodiments, the mobile phone, the merchant customer/payment database, the merchant payment server, the digital wallet server, and the POS system may comprise the mobile phone 202, the merchant customer/payment database 210, the merchant payment server 201, the digital wallet server 204, and the point of sale system 203, respectively, as described with reference to FIG. 2 herein or similar devices.

In some embodiments, prior to step 401, the steps in FIG. 3 has occurred, the customer has selected a digital wallet account as the default payment account, the customer is in line to check out at an in-store point of sale system, and the customer has opened the merchant application to initiate mobile payment.

In step 401, the merchant application retrieves user account payment preferences from the merchant customer/payment database. In step 402, assuming that the digital wallet provider has been configured to be the default payment method, the merchant application calls the digital wallet software component on the customer mobile phone. In step 404, the digital wallet software component passes a digital wallet customer token and the device information to the digital wallet server. In step 407, account information is returned to the digital wallet software component. In step 408, the account information is returned to the merchant application.

After step 408, the merchant application may display a mobile wallet icon and the default payment account on the pairing screen. The pairing screen may include a camera screen for scanning an optical code at the POS. In step 410, the customer takes a picture of a QR code displayed at the POS. In step 411, the merchant application sends the user and the default payment account information to the mobile wallet software component associated with the selected mobile wallet provider. In step 413, the digital wallet software component passes the digital wallet customer token and the digital wallet account information to the digital wallet server. In step 415, the digital wallet server sends the digital wallet session ID to the merchant payment server. In step 416, the digital wallet session ID is provided to the merchant application. In some embodiments, one or more of steps 411, 413, 415, and 416 may occur in parallel.

In step 417, the merchant application passes the POS identifier (e.g. QR code) and the digital wallet session ID to the merchant payment server. In step 418, the wallet broker module of the merchant payment server generates a merchant session ID and associates the merchant session ID with the digital wallet session ID. In step 419, the wallet broker module communicates with POS to drop the QR code from the display screen to signal to the customer that the pairing has been established. In step 420, the wallet broker module reports the success of the pairing process to the merchant application running on the customer mobile device and returns the merchant session ID.

In step 422, the payment system forwards the request to the digital wallet server, requesting payment information (PI) such as payment token, cryptography information (Crypto), etc. In step 425, the digital wallet server uses the digital wallet session ID to retrieve payment token, Crypto, etc. and returns the information to the payment server. In step 426, the merchant payment server stores the information received from the digital wallet server and retrieves hash/handle for the customer account. As part of step 426, in step 421, the broker module passes the digital wallet session ID to the customer accounts payment module and requests the hash/handle associated with the customer account. In step 427, the hash/handle is forwarded to the wallet broker module and the broker module associates the hash/handle with the merchant session ID in preparation for processing the payment.

Figure 5:
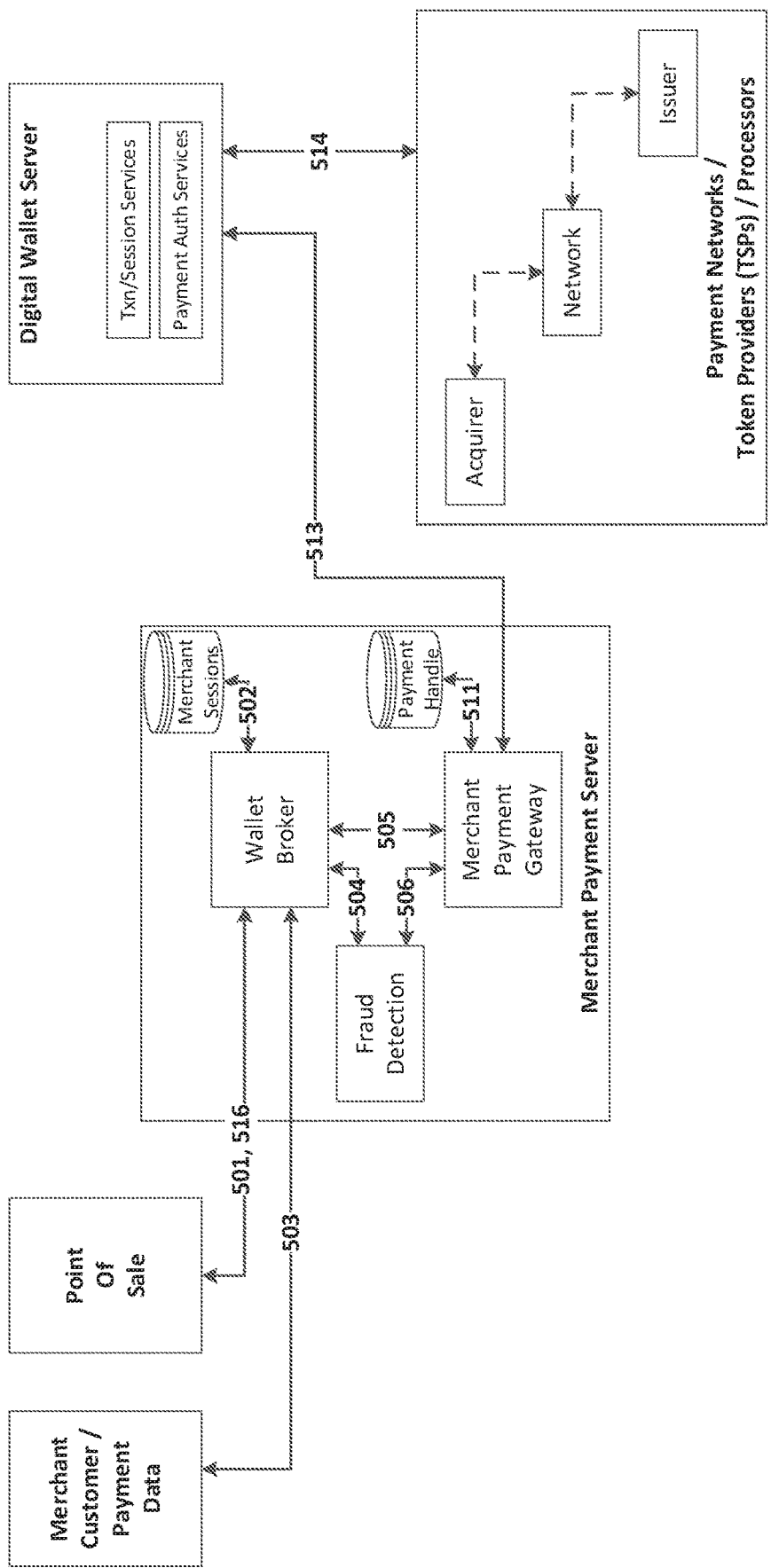
FIG. 5 comprises a process diagram of an authorization process in accordance with several embodiments.

Referring now to FIG. 5, a process for authorizing payment with a merchant system and a POS system is shown. In some embodiments, the merchant customer/payment database, the merchant payment server, the digital wallet server, the POS system, and the payment network may comprise the merchant customer/payment database 210, the merchant payment server 201, the digital wallet server 204, the point of sale system 203, and the payment network 205, respectively, as described with reference to FIG. 2 herein or similar devices.

In some embodiments, prior to step 501, the customer account and the POS have been paired through a pairing process such as the process shown in FIG. 4 and items the customer wants to purchase have been scanned through the POS.

In step 501, the POS system requests payment authorization from the wallet broker module of the merchant payment server. The request comprises a merchant session ID and the authorization amount. In step 502 and step 503, the broker module pulls the session information stored during the pairing process and pulls the customer payment account information from the merchant customer/payment database. In step 504, a fraud detection module of the merchant payment server evaluates the basket content, the user device, etc. to determine if the customer payment account can be used. In step 505, the wallet broker module forwards the transaction request to the merchant payment gateway module. In step 506, the merchant payment module performs a fraud check with the fraud detection module. In step 511, the payment server uses the hash/handle to retrieve payment information (PI) such as payment token, crypto, token requester ID, track data, etc. and sends the information to the merchant payment gateway module. In step 513, the retrieved information is sent to the digital wallet provider server which forwards the authorization request to the payment network in step 514. The provider network then looks up the payment token associated with the digital wallet account and processes the authorization. The authorization result from the provider network is returned to the merchant payment server via the digital wallet server. In some embodiments, the authorization result may be directly communicated between the merchant payment gateway and the payment networks without being routed through the digital wallet server. In step 516, the wallet broker module communicates the authorization response from the digital wallet server to the POS system.

Figure 6:
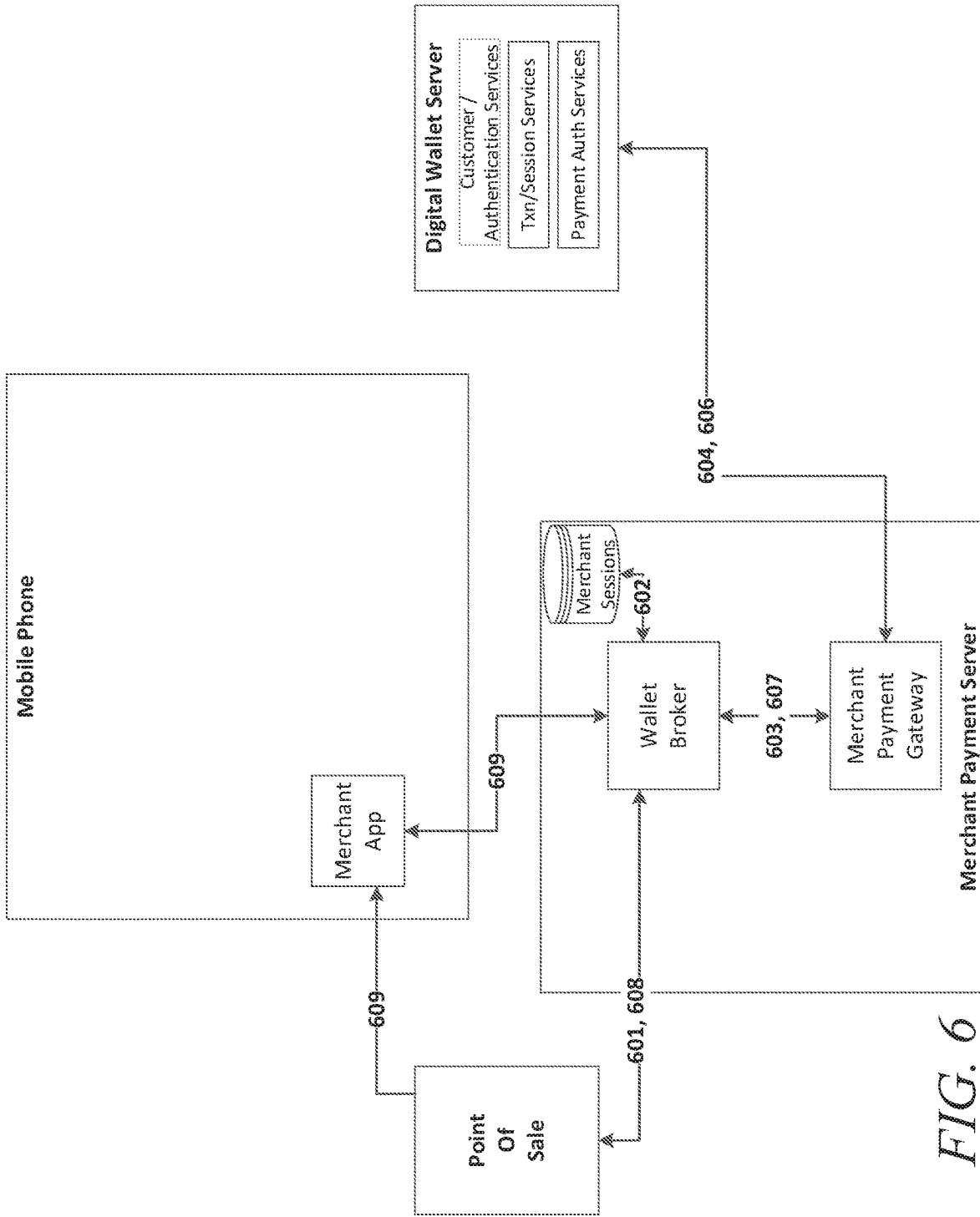
FIG. 6 comprises a process diagram of a confirmation process in accordance with several embodiments.

Referring now to FIG. 6, a process for completing a payment with a digital wallet account is shown. In some embodiments, the mobile phone, the merchant payment server, the digital wallet server, and the POS system may comprise the mobile phone 202, the merchant payment server 201, the digital wallet server 204, and the POS system 203, respectively, as described with reference to FIG. 2 herein or similar devices.

In some embodiments, prior to step 601, the payment authorization, such as the authorization process shown in FIG. 5 has completed, the transaction amount has been collected, and the transaction completion has been initiated at the POS.

In step 601, the POS sends a completion message to the wallet broker module of the merchant payment server. In step 602, the wallet broker module gathers digital wallet session information. In step 603, the broker module builds a confirmation message with transaction level data and sends the confirmation message to the merchant payment gateway module. In step 604, the merchant payment gateway forwards the confirmation message to the digital wallet server and receives a response in step 606. In step 607, the response is forwarded to the wallet broker module which sends the confirmation to the POS system in step 608. In step 609, the broker module further sends a receipt notification to the merchant application on the customer mobile device.

The systems and processes described with reference to FIGS. 3-6 are provided as examples only. Implementation details of the systems and processes described herein may vary without departing from the spirit of the present disclosure. In some embodiments, communications between the merchant application and digital wallet servers may vary depending on the implementation. In a first example, a browser can be launched to facilitate authentication during the provisioning/setup steps. In a second example, a browser may be launched directly from the merchant application for provisioning and setup. In a third example, the merchant application may capture the information and communicate directly with the digital wallet server. In a fourth example, the merchant application may capture the information and communicate with the digital wallet server through the wallet broker module of the merchant payment server. In a fifth example, the merchant application may capture the information and communicate with the digital wallet server through the wallet broker module and the merchant payment gateway of the merchant payment server.

In some embodiments, the storage of the digital wallet customer token may vary depending on the implementation. In a first example, the digital wallet customer token may be stored as part of the digital wallet software component. In a second example, the digital wallet customer token may be stored as part of the merchant application. In a third example, the digital wallet customer token may be stored as part of the merchant customer/payment data by the merchant mobile application. The merchant mobile application may then retrieve the digital wallet customer token via the wallet broker or the merchant payment gateway.

In some embodiments, the digital wallet software component may be a portion of the operating system of the customer mobile device or related software. In some embodiments, when the payment account information for a wallet is stored locally on the phone in a secure element of the mobile phone (not shown), the payment instrument retrieval may occur on the mobile device instead of being pulled from the digital wallet server. In such embodiments, during the pairing process, the mobile application retrieves the payment instrument data by calling the digital wallet software component, which retrieves the information from the secure element and passes the information back to the mobile application. The merchant mobile application may send this data to the wallet broker in the pairing message (e.g. QR code) and the wallet broker, in turn, calls the merchant payment gateway to store the information as a payment handle.

In some embodiments, the digital wallet server may facilitate the payment authorization in place of the merchant sending the authorization through conventional paths. In some embodiments, for authorizations sent directly from the merchant payment gateway to the payment network, the payment networks may retrieve supporting data directly from the digital wallet server. In such embodiments, the digital wallet customer token may be used to trigger the authorization. For example, instead, of creating a digital wallet session for each transaction, the customer token may be passed in the authorization request to the digital wallet server. In such instances, a digital wallet may process authorizations against multiple payment accounts in their wallet. In some embodiments, multiple payment accounts may be handled with a single authorization response when the wallet is responsible for settling individual accounts or with multiple authorization responses when merchant requires each account to be settled individually.

In some embodiments, the user may select the account to use from the mobile application. The selection may occur prior to the pairing process (e.g. between steps 408 and 411). The customer may be asked to select from a list of accounts and the selected account would be used instead of the default account in the subsequent steps Referring now to FIG. 7, a process for pairing a digital wallet application on the mobile phone with a point of sale system is shown. In the process shown in FIGS. 7-9, a digital wallet mobile application, instead of a merchant application, provides the user interface and facilitates the communications with the wallet broker module of the merchant payment server. In some embodiments, the mobile phone, the merchant payment server, the digital wallet server, the POS system, and the payment networks may comprise the mobile phone 202, the merchant payment server 201, the digital wallet server 204, the POS system 203, and the payment networks 205, respectively, as described with reference to FIG. 2 herein or similar devices.

In step 701, the wallet application on the mobile phone scans a QR code provided by the point of sale system. In step 702, the wallet application sends the QR code and other supplemental data to the digital wallet server which creates a digital wallet session ID. In step 703, the digital wallet server requests a token from the token providers (TSPs) through the payment network. In some embodiments, the request comprises transaction-specific information useful for a single authorization. In step 704, the digital wallet retrieves payment account information and adds the information to the pairing message. The digital wallet application then forwards the information, including the digital wallet session ID, to the wallet broker module of the merchant payment server. In step 705, the wallet broker module creates a merchant session and stores the digital wallet session ID. In steps 706 and 707, an acknowledgment is sent back to the digital wallet server which forwards the information to the wallet application to complete the pairing process. In step 708, a message, including merchant session ID, is sent to the POS as notification that pairing has occurred. The POS may drop the QR code in response to step 708. In step 709, the wallet broker sends payment account information to the merchant payment gateway, which stores the account information as a payment handle and responds back in step 710. Wallet Broker then saves the payment handle as part of the session. The stored handle may be used for subsequent authorizations.

Referring now to FIG. 8, a process for authorizing payment with a merchant system and a POS system is shown. In some embodiments, the merchant payment server, the POS system, and the payment networks may comprise the merchant payment server 201, the POS system 203, and the payment networks 205, respectively, as described with reference to FIG. 2 herein or similar devices.

In step 801, the POS system requests for payment authorization by passing a merchant session ID received during a pairing process to the wallet broker module of the merchant payment server. In step 802, the wallet broker module retrieves session data which includes a reference to a payment handle. In step 803, a wallet-level fraud check occurs at the fraud detection module. In step 804 the wallet broker constructs a payment authorization request, including the payment handle, and sends the request to the merchant payment gateway. In step 805, the merchant payment gateway retrieves the payment handle information, which may be used for external authorization and/or fraud detection. In step 806, a payment instrument level fraud check occurs, which may be similar to conventional card payment checks. In step 807, the merchant payment gateway constructs an authorization request and sends the request to the external payment networks.

Referring now to FIG. 9, a process for completing a digital wallet transaction is shown. In some embodiments, the mobile phone, the digital wallet server, the merchant payment server, and the point of sale system may comprise the mobile phone 202, the digital wallet server 204, the merchant payment server 201, and the point of sale system 203, respectively, as described with reference to FIG. 2 herein or similar devices.

In step 901, when the POS system has completed the transaction, a completion message, including transaction details and merchant session ID, is sent to the wallet broker. In step 902, the wallet broker retrieves the digital wallet session ID using the merchant session ID and uses the digital wallet session ID to reference the transaction on the wallet side in step 903. In step 903, the completion message is forwarded to the digital wallet server which then sends the message to the mobile device associated with the session in step 904. In step 905, the acknowledgment is forwarded back to the POS system.

The systems and processes described with reference to FIGS. 3-6 are provided as an example only. Implementation details of the systems and processes described herein may vary without departing from the spirit of the present disclosure. While the wallet application is shown to communicate directly with the digital wallet server, if a wallet has a digital wallet software component, communication may be routed thru the wallet software component instead. In some embodiments, portions of the digital wallet may be integrated with the operating system of the mobile device. In some embodiments, details of the pairing process shown in FIG. 7 assume the payment account information is retrieved from a TSP (Token Service Provider) for each transaction. In alternate embodiments, the payment account information may be retrieved once during set-up, stored somewhere in the digital wallet, and re-used in subsequent transactions without retrieving the information for each transaction. In some embodiments, the digital wallet may be its own TSP, and no external lookup is performed. In such embodiments, the payment processor in the external payment network may retrieve the payment account information during the authorization process instead.

In some embodiments, a digital wallet may leverage a secure element such as a secure hardware storage of payment account information on the phone. For example, the wallet application may retrieve the payment account information from the secure element and pass the payment information to the digital wallet server which, in turn, simply forwards the information to the wallet broker without additional retrieval steps. In another example, the wallet application may pass the payment account information directly to the wallet broker for a simpler integration.

In some embodiments, the digital wallet servers may facilitate the payment authorization process. In such stances, instead of sending payment account information to wallet broker during the pairing process, the wallet broker may send the digital wallet session ID back to a digital wallet server. The digital wallet may then process authorizations against multiple payment accounts in the wallet account. In some embodiments, the digital wallet may handle authorization with a single authorization response when the wallet is responsible for settling individual accounts or with multiple authorization responses when the merchant requires a settlement for each account.

Figure 10:
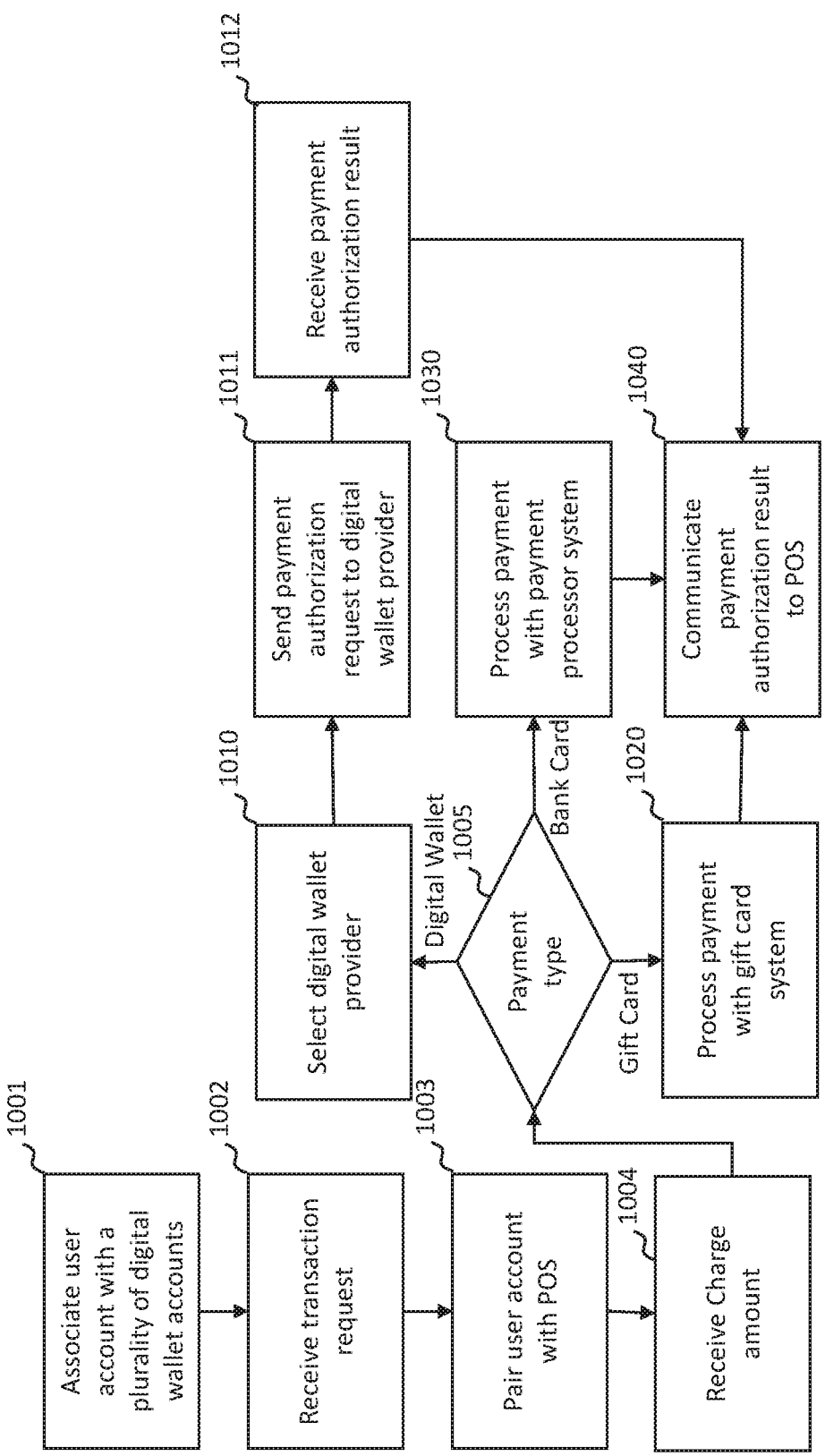
FIG. 10 comprises a flow diagram in accordance with several embodiments.

Referring now to FIG. 10, a method for processing payments through a point of sale system is shown. In some embodiments, the steps shown in FIG. 10 may be performed by a processor-based device such as one or more of a merchant payment system, a merchant payment server, a central computer system, a server, and a point of sale system. In some embodiments, the steps in FIG. 10 may be performed by one or more of the merchant payment system 101 and the point of sale system 103 described with reference to FIG. 1 herein or similar devices.

In step 1001, the system associates a user account with a plurality of digital wallet accounts. As described herein, a user account generally refers to a customer's payment account on the merchant payment system that is maintained and controlled by the merchant. In some embodiments, each digital wallet account associated with the user account is associated with a digital wallet provider. In some embodiments, the digital wallet provider may comprise a third party provider. In some embodiments, each digital wallet is configured to be associated with two or more payment methods such as one or more of a credit card account, a debit card account, a gift card, a bank account, etc. In some embodiments, digital wallet accounts may be added to the user account through a user interface provided by the merchant. In some embodiments, a merchant mobile application may be installed on a user device to add and manage mobile wallet accounts. In some embodiments, when the digital wallet account is initially added, the merchant payment system obtains a authenticate code such as a Cipher-based customer token from the digital wallet provider for future communications regarding the linked digital wallet account. An example of the setup process is described with reference to FIG. 3 herein. In some embodiments, a user account may further be associated with one or more payment methods not associated with a third party digital wallet account. For example, the user account may be directly linked to a credit card, a debit card, a bank account, a gift card, an electronic benefit transfer (EBT) card, a cryptocurrency account, etc.

In step 1002, the system receives a transaction request using the user account. In some embodiments, the transaction request is received from a user device associated with the user account. In some embodiments, the transaction request comprises a user account identifier and a POS identifier associated with an in-store POS system. In some embodiments, the user device is configured to execute a mobile application configured to communicate with the merchant payment system and one or more digital wallet provider systems. In some embodiments, the in-store POS system comprises a display screen and the transaction request is generated by the user device in response to capturing an image (e.g. QR code) displayed on the display screen of the in-store POS system. The scanned identifier may comprise a one-use POS identifier. In some embodiments, the customer may put away their mobile phone after step 1002. In some embodiments, the transaction request comprises a session ID the user device received from the digital wallet provider.

In step 1003, the system pairs the user account with the POS system. In some embodiments, the merchant system generates a merchant session ID associated with the user account and the POS identifier. An example of the pairing process is described with reference to FIGS. 4 and 7 herein.

In step 1004, the system receives a charge amount from the POS system for the transaction. In some embodiments, items may be scanned into the POS system by a store associate or the customer between steps 1002 and 1004 using an optical scanner, an RFID reader, etc. After all the items are scanned, the POS system provides the total charge amount to the merchant payment server.

In step 1005, the system selects a payment type for the transaction from the payment methods associated with the user account. In some embodiments, the system may use a set of user configured rules that indicate which payment method (e.g. credit card or digital wallet) should be used for a transaction to select the payment method. In some embodiments, the rules may associate transaction amount, purchased items, transaction location, etc. with different payment methods. In some embodiments, the user may select a default payment method in user references and use other payment methods for backup. In some embodiments, the user may select a payment method through the merchant application running on the customer mobile device before or during checkout and the payment method selection may be sent along with the transaction request in step 1002. In some embodiments, more than one payment methods may be used for a single transaction. For example, the system may first use gift card balance and charge the remaining balance to a digital wallet account.

If a digital wallet account is selected for payment, the system may further select a digital wallet provider from among the digital wallet accounts associated with the user account in step 1010. In some embodiments, the digital wallet provider is selected based on one or more payment rules associated with the user account. In some embodiments, step 1010 may be combined with step 1005 and/or the digital wallet provider account may be selected based on user-configured rules. In some embodiments, the merchant system may further select a specific payment method (e.g. credit card, debit card, etc.) within a digital wallet account. In some embodiments, the payment method within the digital wallet may instead be select by the digital wallet provider according to the digital wallet's settings.

In step 1011 the system sends a payment authorization request to the digital wallet provider. In some embodiments, the payment authorization request may comprise the user's digital wallet account information previously stored on the merchant payment system in step 1001. In some embodiments, the digital wallet provider may further select a payment method from among the payment methods associated with the digital wallet based on user preferences. In some embodiments, the result of the payment authorization is provided by the digital wallet provider system based on the communication between the digital wallet provider system and at least one payment card industry payment processor system. In step 1012, the system receives payment authorization result from the digital wallet provider system. In some embodiments, the authorization result may be directly communicated between the merchant payment gateway and the payment networks without being routed through the digital wallet server. Examples of digital wallet payment authorization processes are described with reference to FIGS. 5 and 8 herein.

If a gift card associated with the user account is selected for the transaction, in step 1020, the system processes the payment with a gift card system. In some embodiments, the gift card payment may be processed by the gift card processor 106 described with reference to FIG. 1 or a similar system.

If a bank card (e.g. credit card, debit card) is selected for the transaction, in step 1030, the system may directly communicate with one or more payment processor systems to process payments using the one or more payment methods. In some embodiments, the bank card payment may be processed by the payment processor 105 described with reference to FIG. 1 or a similar system. In some embodiments, the payment processor may comprise a payment card industry payment processor system such as Visa, Master, American Express, etc. In some embodiments, EBT cards may be similarly processed with an EBT payment system.

In step 1040, the merchant payment system communicates the payment authorization result from one or more of steps 1012, 1020, and 1030 to the POS system to complete the transaction. In some embodiments, the merchant system may further provide a confirmation/receipt to the user device. Examples of payment confirmation processes are described with reference to FIGS. 6 and 9 herein.

In some embodiments, multiple instances of steps shown in FIG. 10 may be carried out simultaneously on a central computer system for a plurality of POS systems, user devices, and digital wallet providers. With the steps described with reference to FIG. 10, POS systems configured to accept payment through the merchant payment application may accept payment from other digital wallet providers without hardware or software updates. When the merchant payment server and the merchant mobile application on the user mobile devices may be updated to accept new types of digital wallet provider and/or new payment method.

Examples of processes according to various embodiments are described with reference to FIGS. 3-9 herein.

In some embodiments, the open architecture described herein allows a merchant's payment system to incorporate multiple digital wallet accounts such as Apple pay, Google pay, Samsung pay, Chase pay, etc. For example, Apple pay may be configured as the default tender associated with the merchant payment application running on the customer's smartphone. When a customer uses the merchant mobile application to make a payment, the merchant payment system is configured to automatically authenticate the payment with the Apple Pay system, and the broker module returns the authentication validation to the POS.

In some embodiments, one or more of the embodiments include one or more localized IoT devices and controllers. For example, one or more of the user devices and POS systems may form an IoT network. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data.

In one embodiment, a system comprises a plurality of in-store POS systems configured to identify items for checkout, a user accounts database, and a merchant payment system configured to communicate with a plurality of user devices and a plurality of digital wallet provider systems. The merchant payment system comprises a control circuit configured to associate a user account with a plurality of digital wallet accounts in the user accounts database, wherein each digital wallet account is associated with a digital wallet provider and wherein at least one of the plurality of digital wallet accounts is associated with two or more payment methods, receive a transaction request from a user device associated with the user account, the transaction request comprises a user account identifier and a POS identifier associated with an in-store POS system, receive a charge amount from the in-store POS system for a transaction, select a digital wallet provider from the plurality of digital wallet accounts associated with the user account, send a payment authorization request to a digital wallet provider system associated with the digital wallet provider for payment authorization, the payment authorization request comprises digital wallet account information retrieved from the user accounts database, and communicate a result of the payment authorization to the in-store POS system to complete the transaction.

In one embodiment, a method for processing payments through a point of sale (POS) system comprise associating, with a control circuit of a merchant payment system, a user account with a plurality of digital wallet accounts in a user accounts database, wherein each digital wallet account is associated with a digital wallet provider and wherein at least one of the plurality of digital wallet accounts is associated with two or more payment methods; receiving, at the merchant payment system configured to communicate with a plurality of user devices, a transaction request from a user device associated with the user account, the transaction request comprises a user account identifier and a POS identifier associated with an in-store POS system configured to identify items for checkout; receiving a charge amount from the in-store POS system for a transaction; selecting, with the merchant payment system, a digital wallet provider from the plurality of digital wallet accounts associated with the user account; sending, with the merchant payment system coupled with a plurality of digital wallet providers, a payment authorization request to a digital wallet provider system associated with the digital wallet provider for payment authorization, the payment authorization request comprises digital wallet account information retrieved from the user accounts database; and communicating a result of the payment authorization to the in-store POS system to complete the transaction.

In one embodiment, an apparatus for processing payments through a point of sale (POS) system comprises a non-transitory storage medium storing a set of computer readable instructions; and a control circuit configured to execute the set of computer readable instructions which causes to the control circuit to: associate, with a merchant payment system, a user account with a plurality of digital wallet accounts in a user accounts database, wherein each digital wallet account is associated with a digital wallet provider and wherein at least one of the plurality of digital wallet accounts is associated with two or more payment methods; receive, at the merchant payment system configured to communicate with a plurality of user devices, a transaction request from a user device associated with the user account, the transaction request comprises a user account identifier and a POS identifier associated with to an in-store POS system configured to identify items for checkout; receive a charge amount from the in-store POS system for a transaction; select, with the merchant payment system, a digital wallet provider from the plurality of digital wallet accounts associated with the user account; sending, with the merchant payment system coupled with a plurality of digital wallet providers, a payment authorization request to a digital wallet provider system associated with the digital wallet provider for payment authorization, the payment authorization request comprises digital wallet account information retrieved from the user accounts database, and communicate a result of the payment authorization to the in-store POS system to complete the transaction.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing payments through a point of sale (POS) system, the system comprising:
   a plurality of in-store POS systems configured to identify items for checkout;
   a user accounts database; and
   a merchant payment system configured to communicate with a plurality of user devices and a plurality of digital wallet provider systems, the merchant payment system comprises a control circuit configured to:
      associate a user account with a plurality of digital wallet accounts in the user accounts database, wherein each digital wallet account is associated with a different digital wallet provider and wherein at least one of the plurality of digital wallet accounts is associated with two or more payment methods comprising a credit card and a debit card;
      receive a transaction request from the user account via a user device, the transaction request comprises a user account identifier and a POS identifier associated with an in-store POS system of the plurality of in-store POS systems associated with a merchant;
      receive a charge amount from the in-store POS system for a transaction;
      pair the charge amount from the POS system to the transaction request from the user device based on the POS identifier in the transaction request received from the user device;
      select a digital wallet provider from the plurality of digital wallet accounts associated with the user account based on preferences stored with the user account;
      send a payment authorization request to a digital wallet provider system associated with the digital wallet provider for payment authorization, the payment authorization request comprises digital wallet account information retrieved from the user accounts database; and
      communicate a result of the payment authorization to the in-store POS system to complete the transaction.

2. The system of claim 1, wherein the user device is configured to execute a mobile application configured to communicate with the merchant payment system and one or more digital wallet provider systems.

3. The system of claim 1, wherein the transaction request comprises a session ID the user device received from the digital wallet provider.

4. The system of claim 1, wherein the result of the payment authorization is provided by the digital wallet provider system based on a communication between the digital wallet provider system and at least one payment card industry payment processor system.

5. The system of claim 1, wherein the digital wallet provider is selected based on one or more payment rules associated with the user account.

6. The system of claim 1, wherein the user account is further associated with one or more payment methods not associated with the plurality of digital wallet accounts.

7. The system of claim 6, wherein the merchant payment system is further configured to directly communicate with one or more payment processor systems to process payments using the one or more payment methods.

8. The system of claim 6, wherein the merchant payment system is further configured to select from among the plurality of digital wallet accounts and the one or more payment methods associated with the user account for the transaction in response to receiving the transaction request.

9. The system of claim 1, wherein the in-store POS system comprises a display screen and the transaction request is generated by the user device in response to capturing an image displayed on the display screen of the in-store POS system.

10. The system of claim 1, wherein the plurality of digital wallet accounts associated with the user account are associated with a single user.

11. A method for processing payments through a point of sale (POS) system, the method comprising:
   associating, with a control circuit of a merchant payment system, a user account with a plurality of digital wallet accounts in a user accounts database, wherein each digital wallet account is associated with a different digital wallet provider and wherein at least one of the plurality of digital wallet accounts is associated with two or more payment methods comprising a credit card and a debit card;
   receiving, from a user device and at the merchant payment system configured to communicate with a plurality of user devices, a transaction request from the user account, the transaction request comprises a user account identifier and a POS identifier associated with an in-store POS system of the plurality of in-store POS systems associated with a merchant, the in-store POS system being configured to identify items for checkout;
   receiving a charge amount from the in-store POS system for a transaction;
   pairing the charge amount from the POS system to the transaction request from the user device based on the POS identifier in the transaction request received from the user device;
   selecting, with the merchant payment system, a digital wallet provider from the plurality of digital wallet accounts associated with the user account based on preferences stored with the user account;
   sending, with the merchant payment system coupled with a plurality of digital wallet providers, a payment authorization request to a digital wallet provider system associated with the digital wallet provider for payment authorization, the payment authorization request comprises digital wallet account information retrieved from the user accounts database; and
   communicating a result of the payment authorization to the in-store POS system to complete the transaction.

12. The method of claim 11, wherein the user device is configured to execute a mobile application configured to communicate with the merchant payment system and one or more digital wallet provider systems.

13. The method of claim 11, wherein the transaction request comprises a session ID the user device received from the digital wallet provider.

14. The method of claim 11, wherein the result of the payment authorization is provided by the digital wallet provider system based on a communication between the digital wallet provider system and at least one payment card industry payment processor system.

15. The method of claim 11, wherein the digital wallet provider is selected based on one or more payment rules associated with the user account.

16. The method of claim 11, wherein the user account is further associated with one or more payment methods not associated with the plurality of digital wallet accounts.

17. The method of claim 16, wherein the merchant payment system is further configured to directly communicate with one or more payment processor systems to process payments using the one or more payment methods.

18. The method of claim 16, wherein the merchant payment system is further configured to select from among the plurality of digital wallet accounts and the one or more payment methods associated with the user account for the transaction in response to receiving the transaction request.

19. An apparatus for processing payments through a point of sale (POS) system, the apparatus comprising:
- a non-transitory storage medium storing a set of computer readable instructions; and
- a control circuit configured to execute the set of computer readable instructions which causes the control circuit to:
  - associate, with a merchant payment system, a user account with a plurality of digital wallet accounts in a user accounts database, wherein each digital wallet account is associated with a different digital wallet provider and wherein at least one of the plurality of digital wallet accounts is associated with two or more payment methods comprising a credit card and a debit card;
  - receive, from a user device and at the merchant payment system configured to communicate with a plurality of user devices, a transaction request from the user account, the transaction request comprises a user account identifier and a POS identifier associated with an in-store POS system of the plurality of in-store POS systems associated with a merchant, the in-store POS system being configured to identify items for checkout;
  - receive a charge amount from the in-store POS system for a transaction;
  - pair the charge amount from the POS system to the transaction request from the user device based on the POS identifier in the transaction request received from the user device;
  - select, with the merchant payment system, a digital wallet provider from the plurality of digital wallet accounts associated with the user account based on preferences stored with the user account;
  - sending, with the merchant payment system coupled with a plurality of digital wallet providers, a payment authorization request to a digital wallet provider system associated with the digital wallet provider for payment authorization, the payment authorization request comprises digital wallet account information retrieved from the user accounts database; and
  - communicate a result of the payment authorization to the in-store POS system to complete the transaction.

* * * * *